United States Patent

Okawa

(10) Patent No.: US 6,832,105 B2
(45) Date of Patent: Dec. 14, 2004

(54) PORTABLE CELLULAR PHONE, METHOD AND PROGRAM FOR DISPLAYING IMAGE DATA IN PORTABLE CELLULAR PHONE AND STORAGE MEDIUM STORING SAME PROGRAM

(75) Inventor: Tsutomu Okawa, Tokyo (JP)

(73) Assignee: NEC Corporation, Tokyo (JP)

( * ) Notice: Subject to any disclaimer, the term of this patent is extended or adjusted under 35 U.S.C. 154(b) by 379 days.

(21) Appl. No.: 09/771,643

(22) Filed: Jan. 30, 2001

(65) Prior Publication Data

US 2001/0011031 A1 Aug. 2, 2001

(30) Foreign Application Priority Data

Feb. 1, 2000 (JP) ........................................ 2000-024529

(51) Int. Cl.⁷ ................................................ H04M 1/00
(52) U.S. Cl. ..................... 455/566; 455/412.2; 345/636; 345/418
(58) Field of Search ............................... 455/566, 412.2, 455/412.1, 575.1; 345/636, 418, 581, 619, 672, 681

(56) References Cited

U.S. PATENT DOCUMENTS

| | | | | |
|---|---|---|---|---|
| 5,552,806 A | * | 9/1996 | Lenchik | 345/156 |
| 5,761,610 A | * | 6/1998 | Sorensen et al. | 455/558 |
| 5,774,540 A | * | 6/1998 | Davidson et al. | 379/396 |
| 5,784,001 A | * | 7/1998 | Deluca et al. | 340/7.56 |
| 5,809,415 A | * | 9/1998 | Rossmann | 455/422.1 |
| 6,044,248 A | * | 3/2000 | Mochizuki et al. | 340/7.47 |
| 6,195,530 B1 | * | 2/2001 | Smith et al. | 725/32 |
| 6,239,787 B1 | * | 5/2001 | Sugaya | 345/169 |
| 6,415,164 B1 | * | 7/2002 | Blanchard et al. | 455/566 |
| 6,445,396 B1 | * | 9/2002 | Suzuki | 345/636 |
| 6,539,240 B1 | * | 3/2003 | Watanabe | 455/566 |
| 6,628,971 B1 | * | 9/2003 | Yoon et al. | 455/566 |
| 2002/0058500 A1 | * | 5/2002 | Higuchi et al. | 455/412 |

FOREIGN PATENT DOCUMENTS

| | | |
|---|---|---|
| JP | 9-6508 | 1/1997 |
| JP | 09-321890 | 12/1997 |
| JP | 10-304429 | 11/1998 |
| JP | 11-250009 | 9/1999 |

OTHER PUBLICATIONS

Japanese Office Action dated Apr. 6, 2004 with a partial English translation.

* cited by examiner

*Primary Examiner*—William Trost
*Assistant Examiner*—Sharad Rampuria
(74) *Attorney, Agent, or Firm*—McGinn & Gibb, PLLC (57) ABSTRACT

A portable cellular phone and a method for displaying image data which enables simplified control on displaying data on a screen of the portable cellular phone. The portable cellular phone is so configured as to use information packaged data constructed by combining data to be displayed with appended data used to provide instructions for displaying data and so that its main control section performs specified displaying operations in response to instructions contained in the appended data and a display section displays the data.

20 Claims, 10 Drawing Sheets

| command no. | title | operations |
|---|---|---|
| CMD 0 | power ON | To turn the power ON. |
| CMD 1 | call origination | To make a phone call. |
| CMD 2 | incoming call | To receive a phone call. |
| CMD 3 | power OFF | To turn the power OFF. |
| CMD 4 | mail sending | To send mail. |
| CMD 5 | mail receiving | To receive mail. |
| CMD 6 | low voltage alarm | To issue an alarm due to a weak state of a battery. |
| CMD 7 | wake-up alarm | To issue an alarm to inform that it has come to wake up. |
| CMD 8 | time reminder | To issue an alarm to inform that registered schedule time draws near. |
| CMD 9 | wedding anniversary | To perform an operation related to a wedding anniversary. |
| CMD 10 | birthday | To perform an operation related to a birthday. |

FIG.3

| data | title | content | remarks |
|---|---|---|---|
| C | operation command | CMD 1 (The command instructs a call originating processing to be carried out.) | |
| S | sound designation | s = 1 (Mail sending sound is designated.) | |
| R | numbers of times of repetition | r = 1 (Processing is carried out only once.) | |
| N | amount of appended data | n = 1 (The data is made up of one expression.) | |
| L1 | displaying position | x = 0, y = 0 (A displaying position is designated by initially set position.) | |
| T1 | display timing | t = 0 (The displaying is unlimitedly continued until processing is terminated.) | |
| D1 | display information | 1 = "Signals are being now sent. <cr> (line feed.) wait for a while until a receiver picks up a phone." | |

FIG. 4

| data | title | content | remarks |
|---|---|---|---|
| C | operation command | CMD 5 (The command instructs mail receiving processing to be carried out.) | |
| S | sound designation | s = 5 (Mail receiving sound is designated.) | |
| R | numbers of times of repetition | r = 1 (Processing is performed only once.) | |
| N | amount of appended data | n = 6 (The data is made up of six expressions.) | |
| L1 | display position | x = 0, y = 0 (A position to be displayed is designated by initially set positions.) | |
| T1 | display timing | t = 0 (Displaying is continued until a series of processing is terminated.) | |
| D1 | display information | 1 = "Mail being now received" | |
| L2 | display position | x = 0, y = 20 (A position of the image to be displayed is designated by a point being placed by 20 dots in a lower position.) | |
| T2 | display timing | t = 0.5 (The displaying is continued for 0.5 seconds.) | |
| D2 | display information | g = <br>(image displaying data) | |
| L3 | display position | x = 20, y = 20 (A position to be displayed is designated by points being placed by 20 dots in a lower position and by 20 dots in a rightward position.) | |
| T3 | display timing | t = 0.5 (The displaying is continued for 0.5 seconds.) | |
| D3 | display information | g = <br>(image displaying data) | |

FIG. 5

| data | title | content | remarks |
|---|---|---|---|
| L4 | display position | x = 40, y = 20 (A position of the image to be displayed is designated by points being placed by 20 dots in a lower position and by 40 dots in a rightward position.) | |
| T4 | display timing | t = 0.5 (The displaying is continued for 0.5 seconds.) | |
| D4 | display information | g =  (image displaying data) | |
| L5 | display position | x = 60, y = 20 (A position of the image to be displayed is designated by points being placed by 20 dots in a lower position and by 60 dots in a rightward position.) | |
| T5 | display timing | t = 0.5 (The displaying is continued for 0.5 seconds.) | |
| D5 | display information | g =  (image displaying data) | |
| L6 | display position | x = 80, y = 20 (A position of the image to be displayed is designated by points being placed by 20 dots in a lower position and by 80 dots in a rightward position.) | |
| T6 | display timing | t = 2.0 (The displaying is continued for 2.0 seconds.) | |
| D6 | display information | g =  (image displaying data) | |

| data | title | content | remarks |
|---|---|---|---|
| L3 | display position | x = 50, y = 20 (A position of the image to be displayed is designated by points being placed by 20 dots in a lower position and by 50 dots in a rightward position.) | |
| T3 | display timing | t = 0.5 (The displaying is continued for 0.5 seconds.) | |
| D3 | display information | (image displaying data) | |

FIG.10A  counter value dn=1
Data D1 is displayed.

FIG.10B  counter value dn=2
Data D2 is displayed.

FIG.10C  counter value dn=3
Data D3 is displayed.

FIG.10D  counter value dn=4
Data D4 is displayed.

FIG.10E  counter value dn=5
Data D5 is displayed.

FIG.10F  counter value dn=6
Data D6 is displayed.

PORTABLE CELLULAR PHONE, METHOD AND PROGRAM FOR DISPLAYING IMAGE DATA IN PORTABLE CELLULAR PHONE AND STORAGE MEDIUM STORING SAME PROGRAM

BACKGROUND OF THE INVENTION

1. Field of the Invention

The present invention relates to a portable cellular phone having a function to display image data, a method and a program for displaying image data in the portable cellular phone and a storage medium storing a same program.

The present application claims priority of Japanese Patent Application No. 2000-024529 filed on Feb. 1, 2000, which is hereby incorporated by reference.

2. Description of the Related Art

Various conventional portable cellular phones having a function to display image data have been disclosed, for example, in Japanese Patent Application Laid-open Nos. Hei 9-006508, Hei 10-304429 or a like. In a case of image displaying functions of the conventional portable cellular phones, since display data to be displayed (hereinafter called "display data") is made up of single image information, the conventional portable cellular phone cannot understand what kind of processing should be carried out to display image data with the display data only. Therefore, to display the image data on a screen of the conventional portable cellular phone, a method is employed in which a displaying operation is defined, in advance, by software to be used for performing various operations and image information data that matches a specified operation is read and displayed individually from memory by designating its registered location. Moreover, a position where the image data is displayed on a display device of the conventional portable cellular phone is determined by operation processing software constructed in a fixed manner so that a determined position for displaying is assigned for each piece of the image data to be displayed at each time of displaying. As a result, in the conventional portable cellular phone, a screenful of data has to be prepared to cover an entire screen area required for displaying the image data. Moreover, when a moving image is to be displayed, even if the moving image is displayed only on a part of the whole screen of the display device of the conventional portable cellular phone, the screenful of data has to be totally prepared, that is, more memory than is needed is used.

Thus, the image displaying function implemented in the software of the conventional portable cellular phone has problems in that, since contents of displaying operations are predetermined in a fixed manner for each of the conventional portable cellular phones by the software, the image displaying function has no flexibility and in that the image data to be displayed in the conventional portable cellular phone cannot be made shareable among conventional portable cellular phones. Moreover, even when the moving image is displayed on a part of the screen of the display device of the conventional portable cellular phone, a screenful of data is required irrespective of whether such amounts of data are needed or not, thus causing an increase in amounts of memory to be required for display operations. In addition, in the conventional portable cellular phone, since time for which one screen is being displayed and numbers of times of repeating displaying operations are predetermined in a fixed manner by the software, when the display data is to be registered from outside the conventional cellular phone, new image processing software that can meet these fixed conditions is required, thus causing a decrease in flexibility in displaying functions of the conventional cellular phone.

SUMMARY OF THE INVENTION

In view of the above, it is an object of the present invention to provide a portable cellular phone, a method and a program for displaying image data in the portable cellular phone and a storage medium storing a same program, which enables software for performing operations of displaying the image data to have much flexibility, which enables the image data to be made shareable among other portable phones, and which enables amounts of memory to be reduced even when a moving image is to be displayed.

It is another object of the present invention to provide a portable cellular phone, a method and a program for displaying image data in the portable cellular phone and a storage medium storing a same program, which is capable of flexibly setting time for which one screen of the image data is being displayed and number of times of repeating displaying operations, and a storage medium storing a program of the above method for displaying the image data.

According to a first aspect of the present invention, there is provided a portable cellular phone including:

a main control means (main controller) for, by using information packaged data constructed by combining display data with appended data providing instructions for processing of displaying the display data, performing specified displaying operations in accordance with the appended data; and a displaying means (displaying section) for displaying the display data.

In the foregoing, a preferable mode is one wherein the appended data is made up of operation commands which designate processing operations by command numbers, information about sound designation to designate displaying methods by sounds, information about numbers of times of repetition to designate the numbers of times of repetition of processing to be carried out in accordance with the above information packaged data and information about amounts of the appended data to designate amounts of the appended data providing instructions for processing of displaying the display data.

Also, a preferable mode is one wherein the appended data is made up of information about positions for displaying the display data on a screen of the portable cellular phone corresponding to amounts of the appended data, information about displaying timing showing a period of displaying the display data corresponding to amounts of the appended data and information about displaying showing contents of the display data corresponding to amounts of the appended data.

Also, a preferable mode is one that wherein includes a memory means made up of a fixed-type memory or a rewritable memory to store the information packaged data for each of the operation commands and wherein the main control means is constructed so as to read the information packaged data by the command numbers and to be able to use for processing of the display data.

Also, a preferable mode is one wherein the information packaged data is able to be fetched from other devices and/or other portable cellular phones using radio signals.

Also, a preferable mode is one wherein the information packaged data is able to be sent and/or received through external data input/output means.

Also, a preferable mode is one wherein the external data input/output means is a wireless-type data sending and receiving device.

According to a second aspect of the present invention, there is provided a method for displaying image data in a portable cellular phone comprising:

a step of performing, by using information packaged data constructed by combining display data with appended data providing instructions for processing of displaying the display data, specified displaying operations in accordance with the appended data; and a step of displaying the display data.

Also, according to a third aspect of the present invention, there is provided a program for causing a central processing unit to carry out display operations of the portable cellular phone, the program including:

a step of performing, by using information packaged data constructed by combining display data with appended data providing instructions for processing of displaying the display data, specified displaying operations in accordance with the appended data; and a step of displaying the display data.

Further, according to a fourth aspect of the present invention, there is provided a storage medium storing a program for causing a central processing unit to carry out display operations of the portable cellular phone, the program comprising:

the step of performing, by using the information packaged data constructed by combining display data with appended data providing instructions for processing of displaying the display data, specified displaying operations in accordance with the appended data; and the step of displaying the display data.

With the above configurations, since data to be displayed in a portable cellular phone is made packaged by combining with appended data adapted to provide instructions for processing of displaying the display data, only by designating a command number to specify information packaged data, a series of related processing can be carried out, thus enabling simplified control of operations and allowing software for displaying to be made shareable. Since the data required for displaying processing is made packaged, flexibility at a time of storing the display data in memory can be expanded, the information packaged data can be stored not only in a ROM (Read Only Memory) in a fixed manner but also in a RAM (Random Access Memory) in an arbitrary manner, the information packaged data can be easily fetched from information contained in radio signals or can be input through external data input/output devices.

With another configuration as above, since a partial image can be displayed by designating a display location, use of a whole screen is not required and an amount of memory to be used can be saved.

With still another configuration as above, since time for which one screen is being displayed or number of times of repetition of displaying operations can be arbitrarily designated, flexibility in displaying operations is increased and characters or images can be expressed more freely, thus providing effective image displaying performance.

BRIEF DESCRIPTION OF THE DRAWINGS

The above and other objects, advantages and features of the present invention will be more apparent from the following description taken in conjunction with the accompanying drawings in which:

FIGS. 10(*a*) to 10(*f*) are diagrams illustrating a display example at the time of receiving mail in the portable cellular phone according to the embodiment.

DETAILED DESCRIPTION OF THE PREFERRED EMBODIMENTS

Best modes of carrying out the present invention will be described in further detail using various embodiments with reference to the accompanying drawings.

Embodiment

Figure 1:
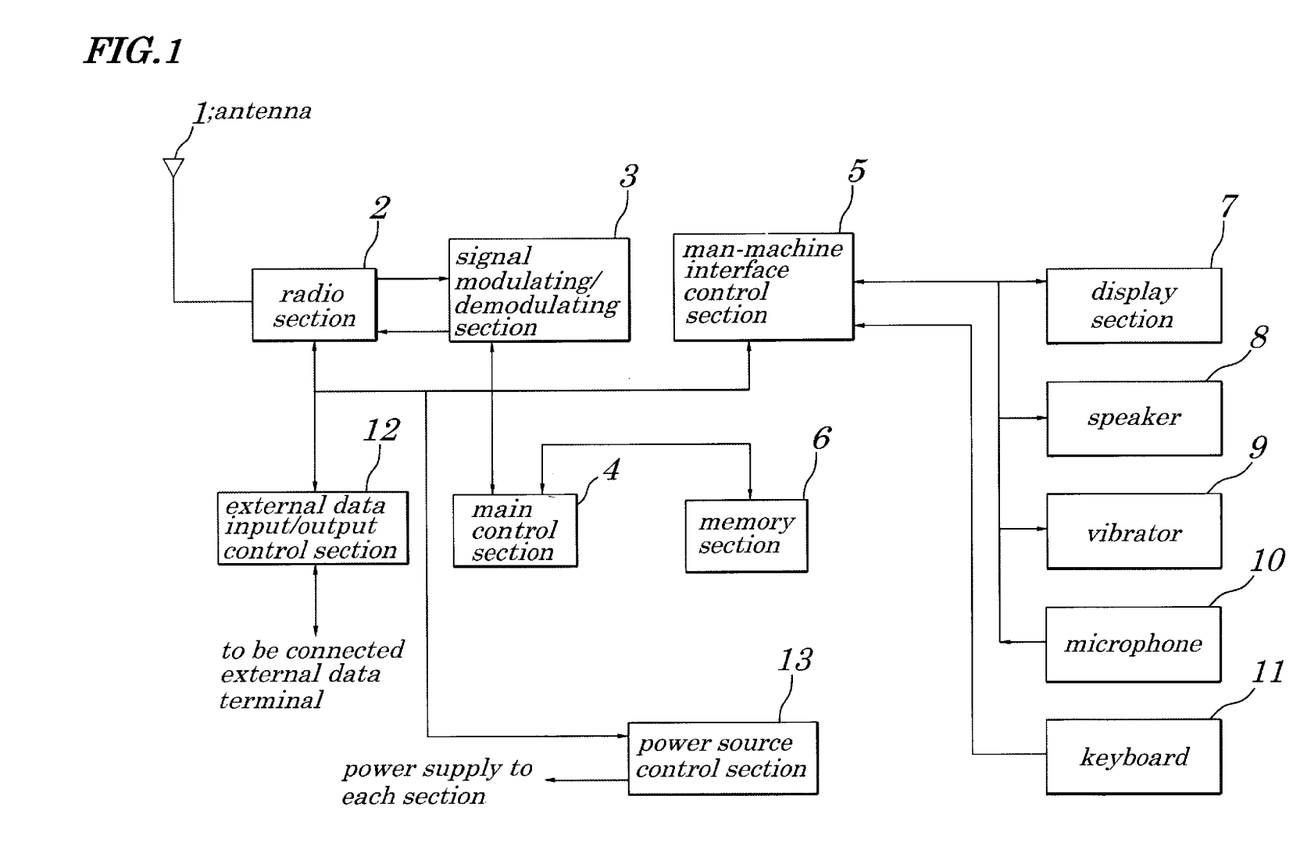
FIG. 1 is a schematic block diagram showing configurations of a portable cellular phone according to an embodiment of the present invention.

FIG. 1 is a schematic block diagram showing configurations of a portable cellular phone according to an embodiment of the present invention.

The portable cellular phone of the embodiment, as shown in FIG. 1, chiefly includes an antenna 1, a radio section 2, a signal modulating/demodulating section 3, a main control section 4, a man-machine interface (MMI) control section 5, a memory section 6, a display section 7, a speaker 8, a vibrator 9, a microphone 10, a keyboard 11, an external data input/output control section 12 and a power source control section 13. The antenna 1 sends and receives radio signals. The radio section 2 generates radio signals to be sent, receives radio signals and extracts signals addressed to the user's phone from the received radio signals. The signal modulating/demodulating section 3 modulates signals to be sent and demodulates received signals. The main control section 4 has a CPU (Central Processing Unit) adapted to manage main operations of the portable cellular phone in accordance with CPU operating programs. The MMI control section 5 transmits input voice and/or control information to the signal modulating/demodulating section 3 and the main control section 4 and outputs the voice and/or control information fed from the signal modulating/demodulating section 3 and the main control section 4 to outside. The memory section 6 stores CPU operation programs, information packaged data and various control data. The display section 7 visually provides display information of the portable cellular phone. The speaker 8 provides acoustically, voice signals, alarm signals or a like. The vibrator 9 informs a user of an arrival of signals. A microphone 10 inputs voice signal of the user. The keyboard 11 inputs control data of the user. The external data input/output control section 12 is connected to external data terminals and inputs and/or outputs data to and from outside. The power source control section 13 supplies power to all parts of the portable cellular phone and controls supply power.

Operations to be performed at a time of receiving signals of the portable cellular phone of the embodiment are hereinafter described in detail by referring to FIG. 1.

The antenna 1 receives radio signals from external phones. The radio section 2 extracts signals addressed to the user's phone from radio signals input from the antenna 1 and outputs the received signals to the signal modulating/demodulating section 3. The signal modulating/demodulating section 3 demodulates signals fed from the radio section 2 to generate digital data and to send out the digital data to the main control section 4. The main control section 4 having the CPU manages main operations of the portable cellular phone in accordance with the CPU operation programs and, at a same time, monitors digital data obtained by the demodulation in the signal modulating/demodulating section 3 to perform operations in accordance with contents of the digital data. When the main control section 4 detects an arrival of signals by receiving information calling the user's phone, performs processing so as to be moved to continuous signal receiving operations, causing signals received by the radio section 2 to be transferred to the signal modulating/demodulating section 3 until signal addressed to the user's phone is terminated and signal receiving operation is then continued. Moreover, the main control section 4, when detecting digital data about an operation command in the received digital data which has been demodulated, reads information packaged data corresponding to a number of a command from the memory section 6 and instructs the MMI control section 5 to perform signal receiving operations required by contents of the read data. The microphone 10 may be used in a case of voice transmission at a time of sending signals. The MMI control section 5, in accordance with instructions from the main control section 4, instructs the display section 7 to display various images, the speaker 8 to output various voices or sounds and the vibrator 9 to inform the user of the arrival of signals by vibration. The MMI control section 5 also manages data input through the keyboard 11 by the user and transfers contents of data input by the user. The main control 4, in response to information given, carries out processing of other various functions. The external data input/output control section 12, in accordance with instructions of the main control section 4, outputs data to external data terminals and inputs data fed from the external data terminals and transfers the data to the main control section 4. The power source control section 13 supplies power to the whole portable cellular phone and manages operations of the power source in accordance with instructions of the main control section 4.

Figure 2:
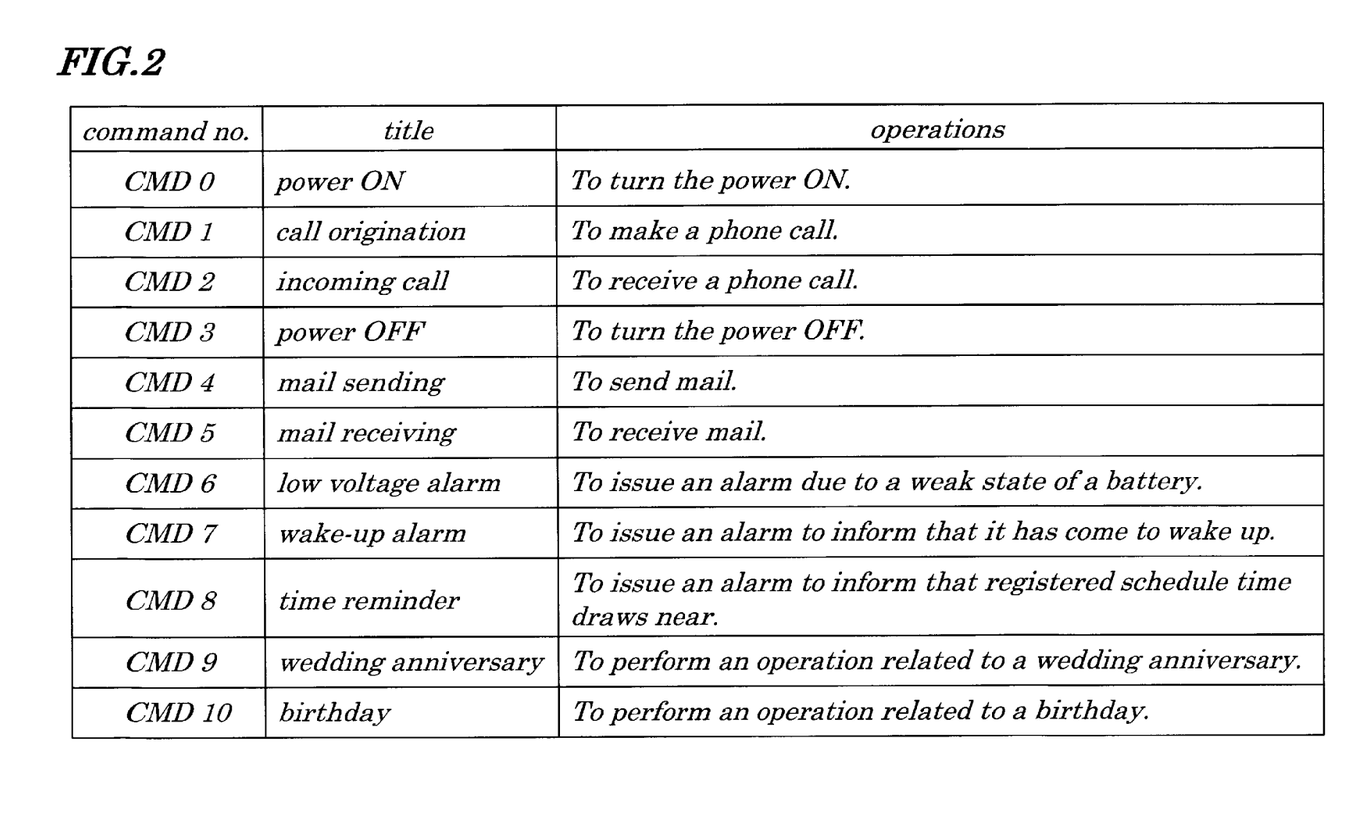
FIG. 2 shows examples of operating commands making up information packaged data which contains image data with additional data employed in the portable cellular phone according to the embodiment.

FIG. 2 shows examples of operating commands making up information packaged data which contains image data with additional data employed in the portable cellular phone according to the embodiment.

As shown in FIG. 2, basic configurations of the information packaged data to be used in combination with the image data with additional data are made up of a plurality of operation commands. The information packaged data is stored, in a fixed manner, in a ROM of the memory section 6, or in a temporary manner, in a RAM of the memory section 6 or in a buffer of the memory section 6 temporarily as information data sent by radio signals. The portable cellular phone reads the information packaged data from these storage devices as needs come up to perform operations. An example command includes CDM 0 to CDM 10, as shown in FIG. 2. Each command has its own title. The title of the CDM 0 is "Power ON" representing an operation of turning the power ON. The title of the CDM 1 is "Call origination" representing an operation of making a phone call. The title of the CDM 2 is "Incoming call" representing an operation of receiving a phone call. The title of the CDM 3 is "Power OFF" representing an operation of turning the power OFF. The title of the CDM 4 is "Mail sending" representing a process of sending mail. The title of the CDM 5 is "Mail receiving" representing a process of receiving mail. The title of the CDM 6 is "Low voltage alarm" representing an operation of issuing an alarm due to a weak state of a battery. The title of the CDM 7 is "Wake-up alarm" representing an operation of issuing an alarm to inform that it has come time to wake up. The title of the CDM 8 is "Time reminder" representing an operation of issuing an alarm to inform that registered schedule time draws near. The title of the CDM 9 is "Wedding anniversary" representing that an operation related to the wedding anniversary is performed. The title of the CDM 10 is "Birthday" representing that an operation related to the birthday is performed.

Figure 3:
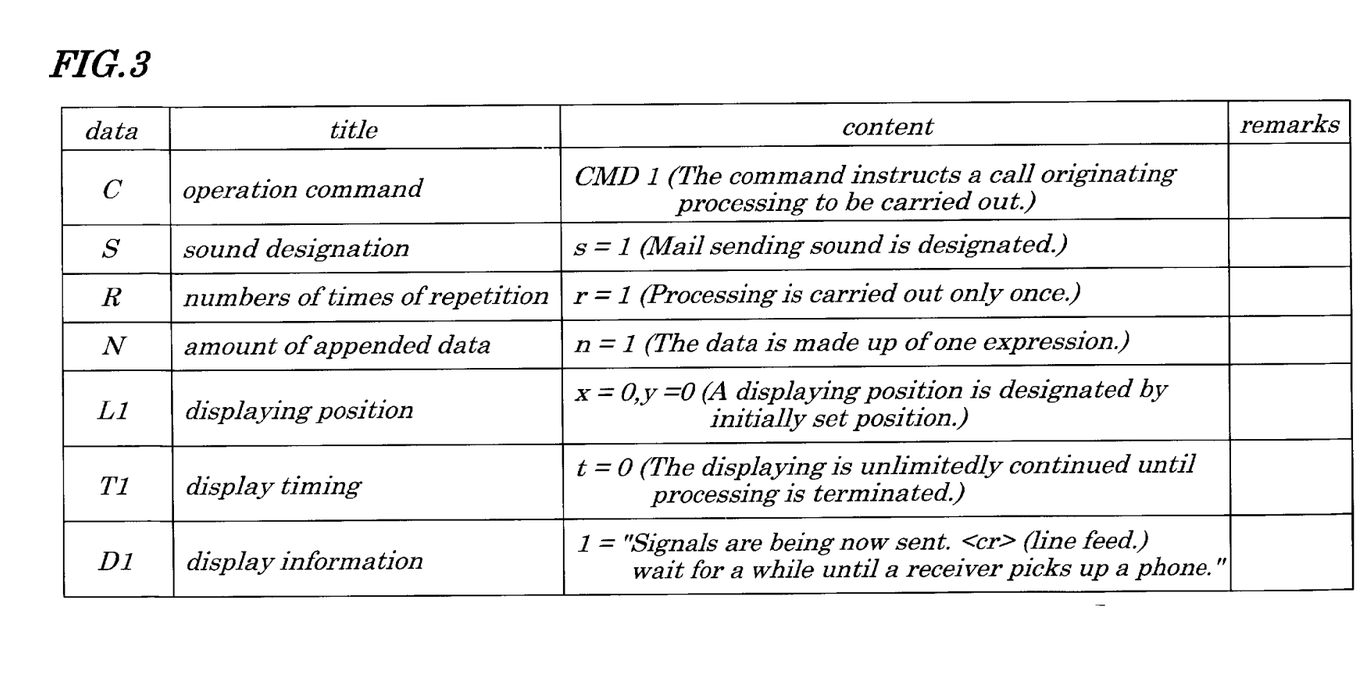
FIG. 3 is a table showing a first block of examples of concrete data contained in the information packaged data for displaying employed in the portable cellular phone according to the embodiment.

FIG. 3 is a table showing a first block of examples of concrete data contained in the information packaged data for displaying employed in the portable cellular phone according to the embodiment.

A first block of example configurations of concrete data making up the information packaged data, as shown in FIG. 3, shows a case in which appended data is made up of one expression and display data contains character information only. The first block in this case is made up of data "C", "S", "R", "N", "L1", "T1" and "D1". Each data has its own title. The title of the data "C" is "Operation command" having a content that its command number is CDM 1, which means that the command instructs a call originating processing to be carried out. The title of the data "S" is "Sound designation" having a content that s=1, which means that a mail sending sound is designated. The title of the data "R" is "Numbers of times of repetition" having a content that r=1, which means that processing is performed only once. The title of the data "N" is "Amount of appended data" having a content that n=1, which means that the data is made up of one expression. The title of the data "L1" is "Displaying position" having a content that x=0 and y=0, which means that a position to be displayed is designated by initially set positions. The title of the data "T1" is "Display timing" having a content that t=0, which means that displaying is continued unlimitedly until operation is terminated. The title of the data "D1" is "Display information" having a content that 1="Signals are now being sent. <cr> (line feed) Wait for a while until a receiver picks up a phone.", which means that this data is data to be displayed by characters.

Figure 4:
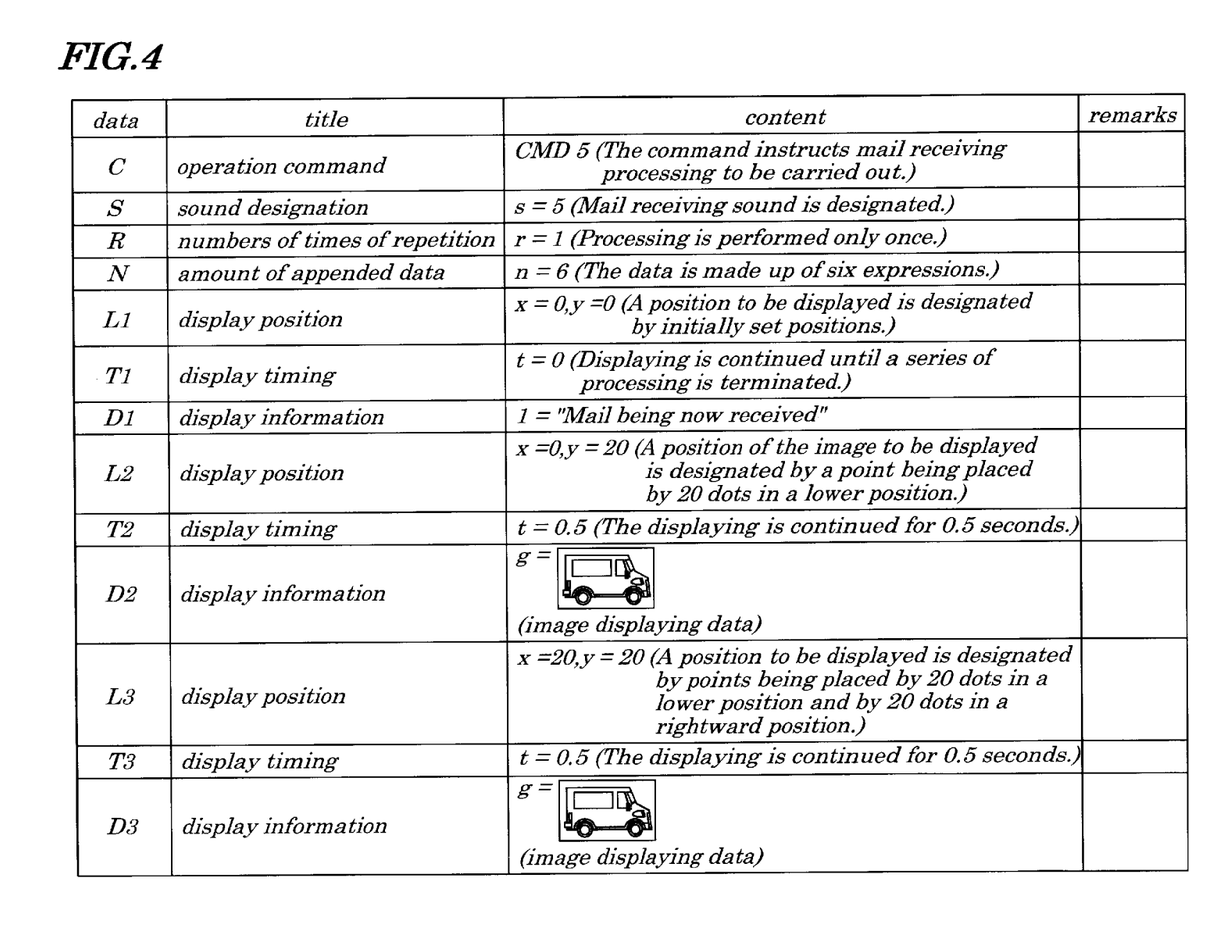
FIG. 4 is a table showing a second block of examples of concrete data contained in the information packaged data for displaying employed in the portable cellular phone according to the embodiment.
Figure 5:
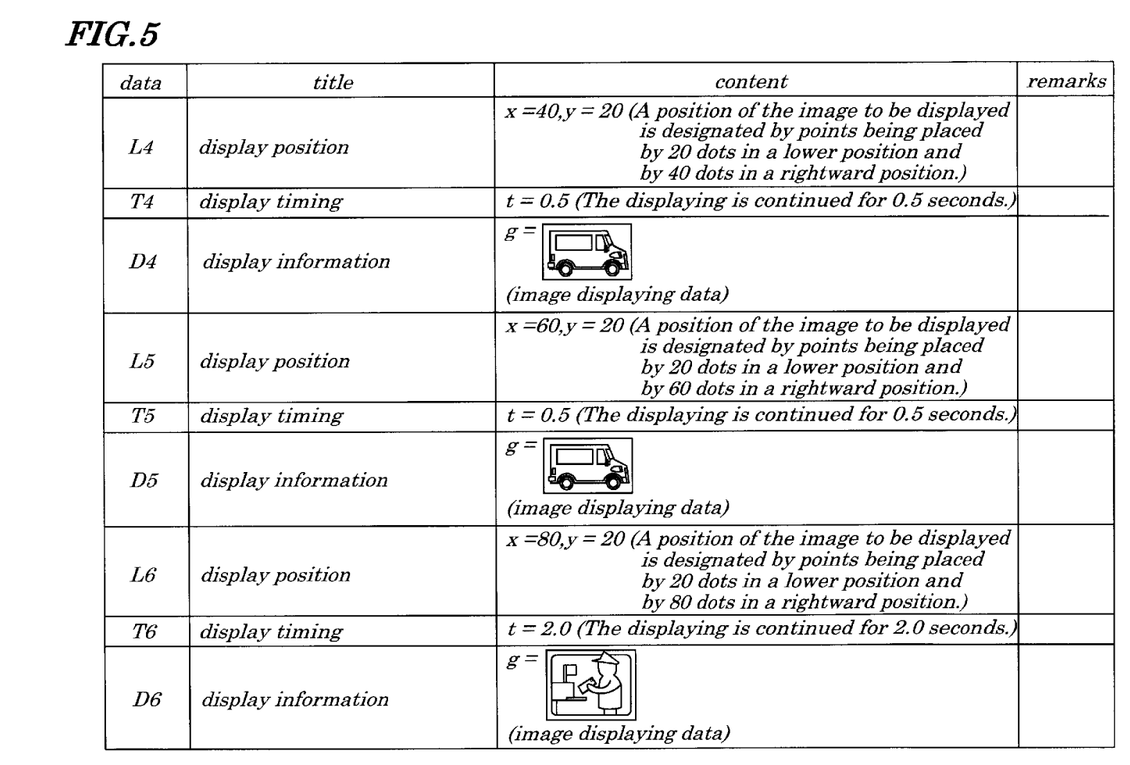
FIG. 5 is a continuation of the table of the second block of examples of concrete data contained in the information packaged data for displaying employed in the portable cellular phone according to the embodiment.

FIGS. 4 and 5 are tables showing a second block of examples of concrete data contained in the information packaged data for displaying employed in the portable cellular phone according to the embodiment.

A second block of examples of concrete data making up the information packaged data, as shown in FIGS. 4 and 5, shows a case in which appended data is made up of six expressions and display data contains both character information and image information in a mixed manner. The second block in this case is made up of data "C","S", "R", "N", "L1", "T1", "D1", "L2", "T2", "D2", "L3", "T3", "D3", "L4", "T4", "D4", "L5", "T5", "D5", "L6", "T6" and "D6". Each data has its own title. The title of the data "C" is "Operation command" having a content that the command number is CDM 5, which means that the command instructs mail receiving processing to be carried out. The title of the data "S" is "Sound designation" having a content that s=5, which means that a mail receiving sound is designated. The title of the data "R" is "Numbers of times of repetition" having a content that r=1, which means that processing is performed only once. The title of the data "N" is "Amount of appended data" having a content that n=6, which means that the data is made up of six expressions. The title of data "L1", "L2", "L3", "L4", "L5" and "L6" is "Display position". These display positions are changed in order. That is, contents of the data "L1" are that x=0 and y=0, which means that a position to be displayed is designated by initially set positions. Contents of the data "L2" are that x=0 and y=20, which means that a position of an image to be displayed is designated by a point being placed by 20 dots in a lower position and by 0 (zero) dots in a rightward position. Contents of the data "L3" are that x=20 and y=20, which means that a position of the image to be displayed is designated by points being placed by 20 dots in a lower position and by 20 dots in a rightward position. Contents of the data "L4" are that x=40 and y=20, which means that a position of the image to be displayed is designated by points being placed by 20 dots in a lower position and by 40 dots in a rightward position. Contents of the data "L5" are that x=60 and y=20, which means that a position of the image to be displayed is designated by points being placed by 20 dots in a lower position and by 60 dots in a rightward position. Contents of the data "L6" are that x=80 and y=20, which means that a position of the image to be displayed is designated by points being placed by 20 dots in a lower position and by 80 dots in a rightward position. The title of the data T1, T2, T3, T4, T5 and T6 is "Display Timing". The display timing is also changed. That is, contents of the data T1 are that t=0, which means that displaying is continued until a series of processing is terminated. Contents of the data T2, T3, T4 and T5 are that t=0.5, which means that the displaying is continued for 0.5 seconds. Contents of the data T6 are that t=2.0, which means that the displaying is continued for 2.0 seconds. The title of the data D2, D3, D4, D5 and D6 is "Display information". Contents of the data D1 are that 1="Mail being now received" (that is, the data is displayed in characters). Contents of the data D1, D2, D3, D4, D5 and D6 are that g=images shown in FIGS. 4 and 5 (that is, the data is displayed by images).

Figure 6:
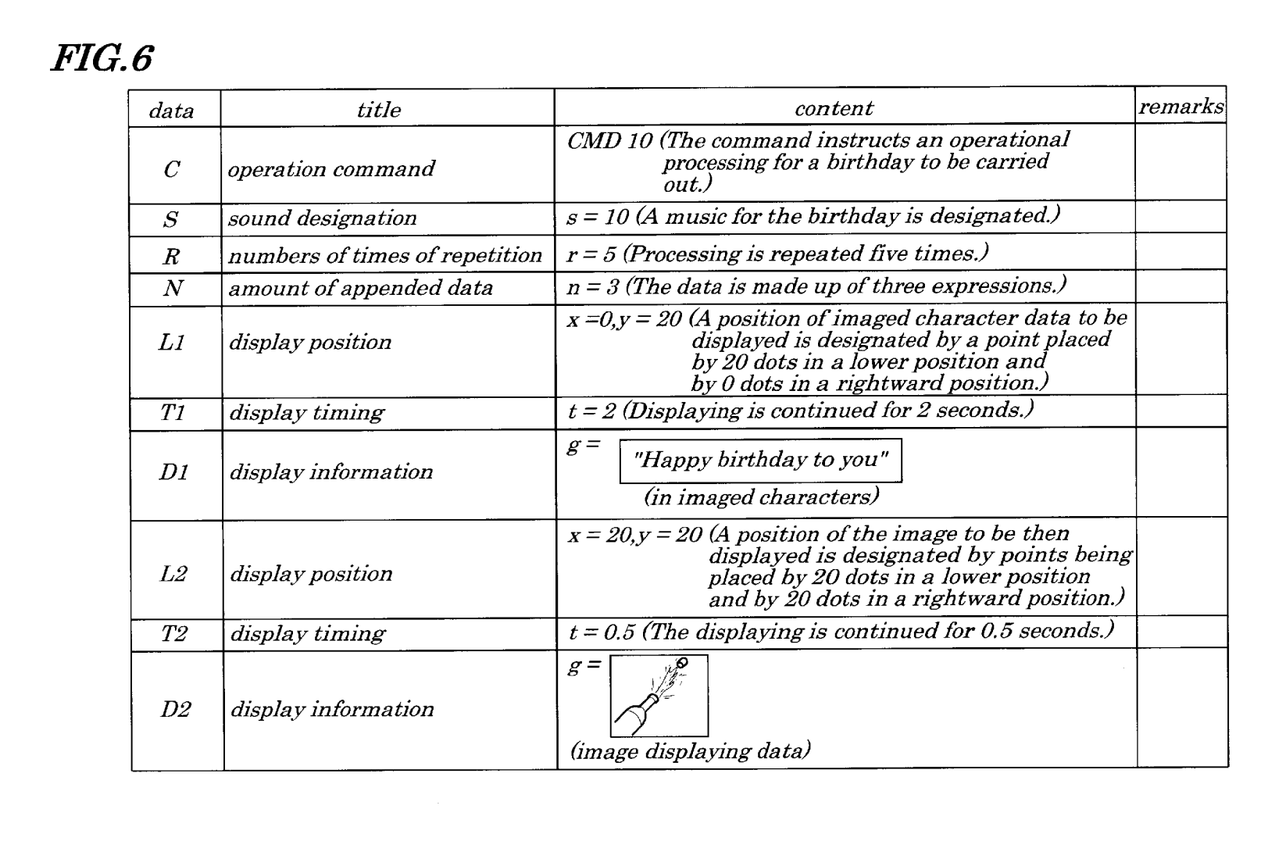
FIG. 6 is a table showing a third block of examples of concrete data contained in the information packaged data for displaying employed in the portable cellular phone according to the embodiment.
Figure 7:
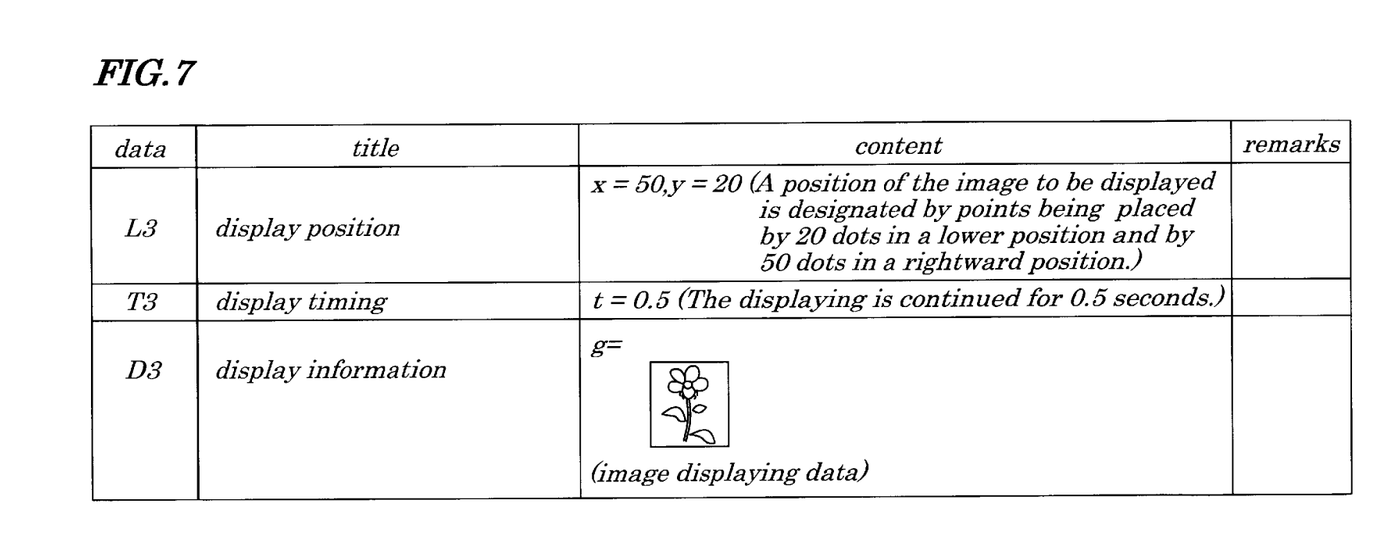
FIG. 7 is a continuation of the table of the third block of examples of concrete data contained in the information packaged data for displaying in the portable cellular phone according to the embodiment.

FIGS. 6 and 7 are tables showing a third block of examples of concrete data contained in the information packaged data for displaying employed in the portable cellular phone according to the embodiment.

A third block of examples of concrete data making up the information packaged data, as shown in FIGS. 6 and 7, shows a case in which appended data is made up of three expressions and display data contains image information only. The third block in this case is made up of data "C", "S", "R", "N", "L1", "T1", "D1", "L2", "T2", "D2", "L3", "T3" and "D3". Each data has its own title. The title of the data "C" is "Operation command" having a content that the command number is CDM 10, which means that the command instructs an operational processing for a birthday to be carried out. The title of the data "S" is "Sound designation" having a content that s=10, which means that music for the birthday is designated. The title of the data "R" is "Numbers of times of repetition" having a content that r=5, which means that processing is repeated five times. The title of the data "N" is "Amount of appended data" having a content that n=3, which means that the data is made up of three expressions. The title of data "L1", "L2" and "L3" is "Display position". These display positions are changed in order. That is, contents of the data "L1" are that x=0 and y=20, which means that a position of imaged character data to be displayed is designated by a point placed by 20 dots in a lower position and by 0 (zero) dots in a rightward position. Contents of the data "L2" are that x=20 and y=20, which means that a position of an image to be displayed is designated by points being placed by 20 dots in a lower position and by 20 dots in a rightward position. Contents of the data "L3" are that x=50 and y=20, which means that a position of the image to be displayed is designated by points being placed by 20 dots in a lower position and by 50 dots in a rightward position. The title of the data T1, T2 and T3 is "display timing". The display timing is also changed. That is, contents of the data T1 are that t=2, which means that displaying is continued for 2 seconds. Contents of the data T2 and T3 are that t=0.5, which means that the displaying is continued for 0.5 seconds. The title of the data D1, D2 and D3 is "Display information". Contents of the data D1 are that g="Happy birthday to you" (that is, the data is displayed in imaged characters) . Contents of the data D2 and D3 are that g=images shown in FIG. 6 and FIG. 7, respectively (that is, the data is displayed by images shown in FIGS. 6 and 7).

Operations of the portable cellular phone of the embodiment will be hereinafter explained in detail by using a case of receiving mail as an example and by referring to FIGS. 1, 2, 4, 5, 8 and 9.

Figure 8:
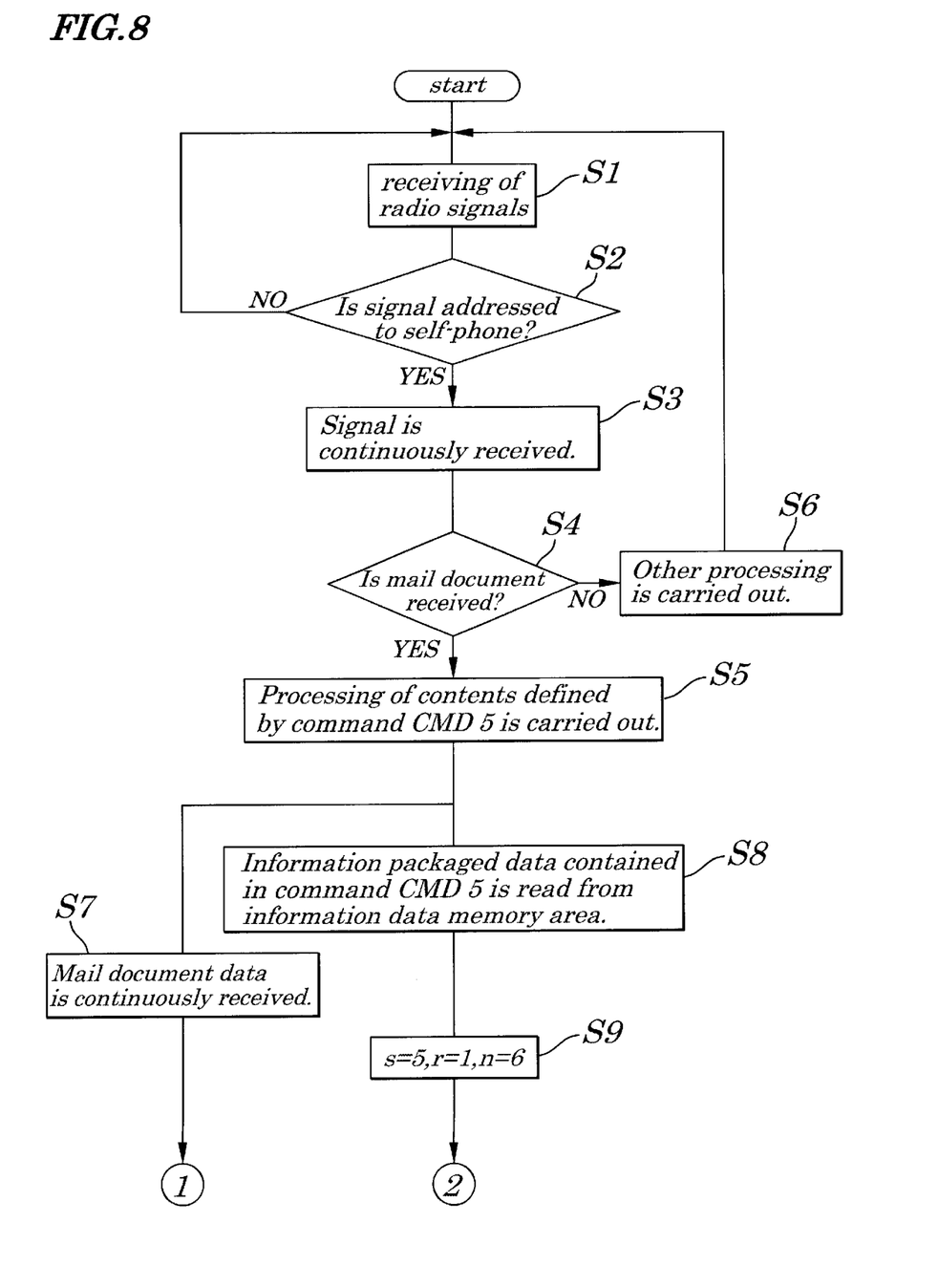
FIG. 8 is a flowchart showing main operations at a time of receiving mail in the portable cellular phone according to the embodiment.
Figure 9:
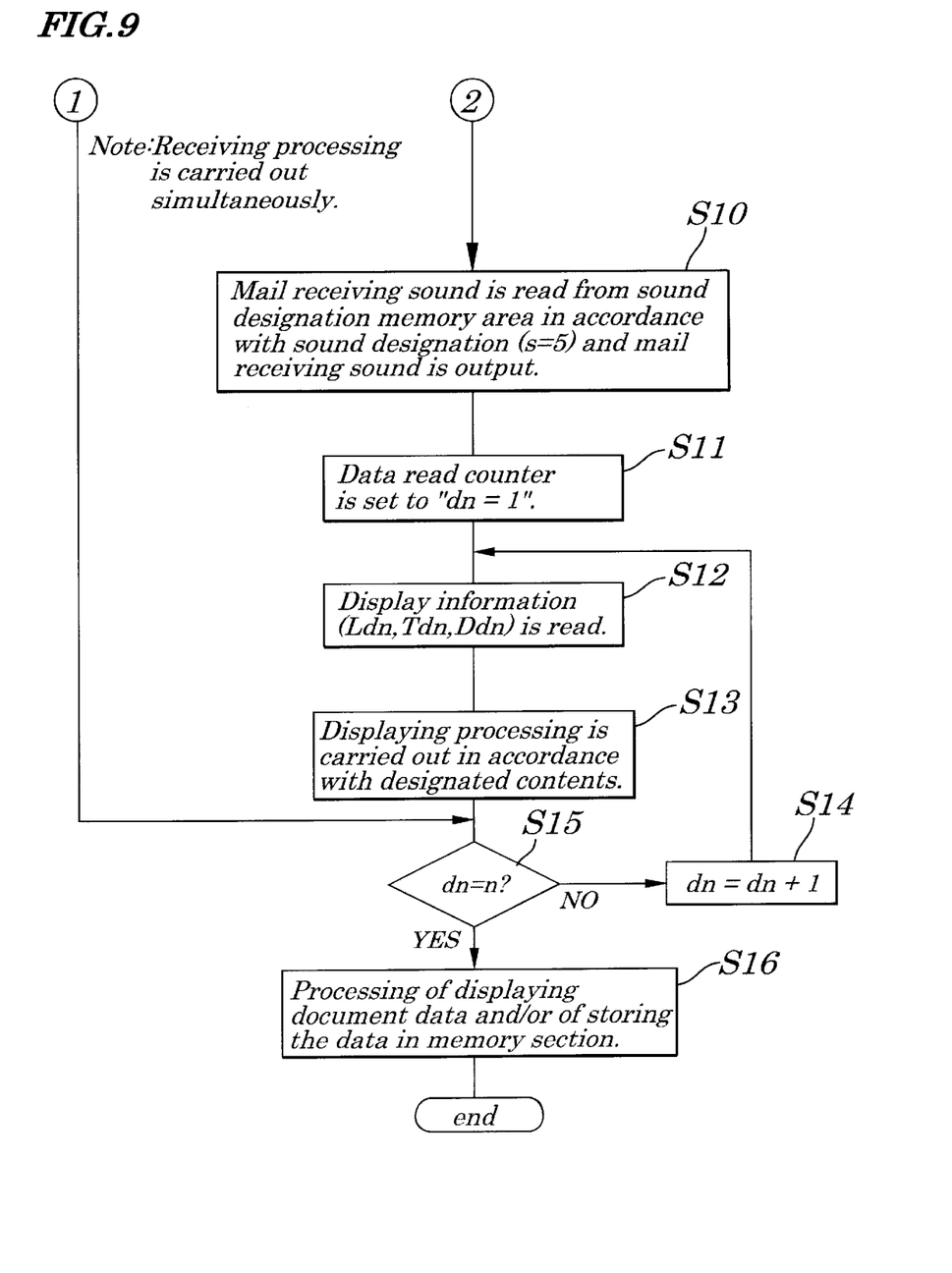
FIG. 9 is another flowchart showing main operations at the time of receiving mail in the portable cellular phone according to the embodiment.

FIGS. 8 and 9 are flowcharts showing main operations at a time of receiving mail in the portable cellular phone according to the embodiment;

A radio signal (including mail receiving data) input from the antenna 1 is received by the radio section 2 (FIG. 8, Step S1) and sent to the signal modulating/demodulating section 3. The received radio signal is demodulated by the signal modulating/demodulating section 3 and is converted to a digital signal and is sent to the main control section 4. The main control section 4 judges whether the digital signal is addressed to the user's phone or not (FIG. 8, Step S2).

When the signal is judged to be addressed to the user's phone, the main control section 4 continues to receive the data from the signal modulating/demodulating section 3 (FIG. 8, Step S3) and judges which processing should be carried out. Moreover, the main control section 4 judges whether a mail document is received or not (FIG. 8, Step S4) by using the data "C" and when the data is judged to be the mail document (CMD 5), carries out processing of contents defined by the command CMD 5 (FIG. 8, Step S5). If the data is not the mail document, other processing is carried out (FIG. 8, Step S6) and procedure is returned back to Step S1.

Next, the main control section 4 carries out processing of receiving the mail document data that are continuously sent from the signal modulating/demodulating section 3 (FIG. 8, Step S7) and, at a same time, reads information packaged data contained in the command CMD 5 stored in the image data area with appended data in the memory section 6. If the information packaged data contained in the command CMD 5 (FIG. 8, Step S8) are the second block of the example data shown in FIGS. 4 and 5, the contents of the commands "S", "R" and "N" are designated to be s=5, r=1 and n=6 (FIG. 8, Step S9), respectively. First, the main memory section 4, in accordance with the sound designation (s=5), reads mail receiving sound data from a sound designation memory area in the memory section 6 and transfers the data to the MMI control section 5. The MMI control section 5 converts received mail receiving sound data to a sound signal and causes the speaker 8 to output the mail receiving sound (FIG. 9, Step S10). Moreover, the main control section 4, in accordance with the designation of the number of times of repetition of displaying (r=1), carries out processing only once. The main control section 4, in accordance with the designation of the amount of appended data (n=6), processes display information made up of six expressions.

Then, the main control section 4 sets a data read counter (not shown) so that the count value dn=1 (FIG. 9, Step S11) and reads first display information (L1, T1, D1) (FIG. 9, Step S12) and provides instructions for displaying to the MMI control section 5 in accordance with contents of read data (Display position x=0, y=0; display timing t=0; display information 1="Mail being now received". The MMI control section 5, in accordance with designated contents, displays the display information (character display data) at the display section 7 (FIG. 9, Step S13). Then, the main control section 4 increments the count value "dn" of the data read counter (Increment of count value dn by 1) (FIG. 9, Step S14) and reads next display information (L2, T2, D2) to carry out a same processing and to display next display information (image displaying data). The same processing is repeated six times (FIG. 9, Step S15). The main control section 4, when having completed the processing of the command CMD 5, carries out processing of document data that has simultaneously received (FIG. 9, Step S16). The processing includes a transfer of the document data to the MMI control section 5 to cause the display section 7 to display the document data, a transfer of the document data to the memory section 6 to store it as storage data or a like.

Next, examples of concrete display in the portable cellular phone provided at a time of receiving mail will be explained below by referring to FIGS. 10(a) to 10(f).

Figure 10A:
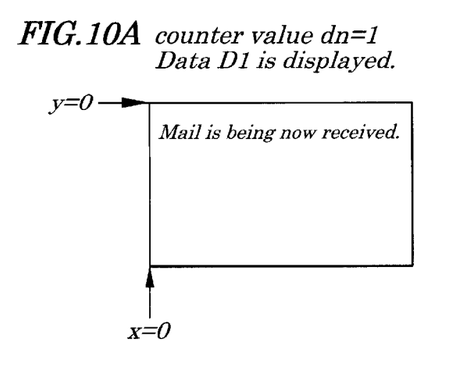
Figure 10B:
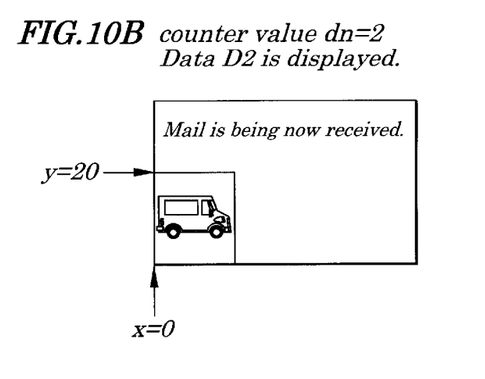
Figure 10C:
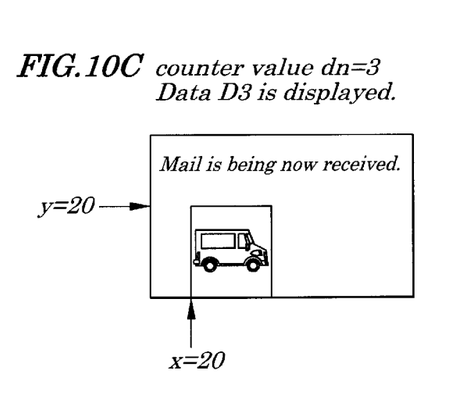
Figure 10D:
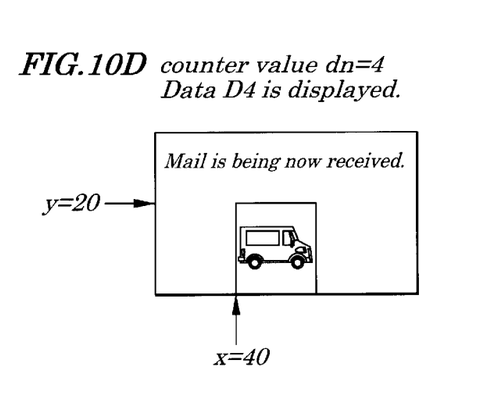
Figure 10E:
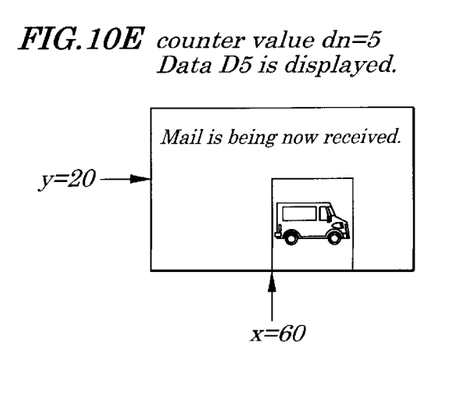
Figure 10F:
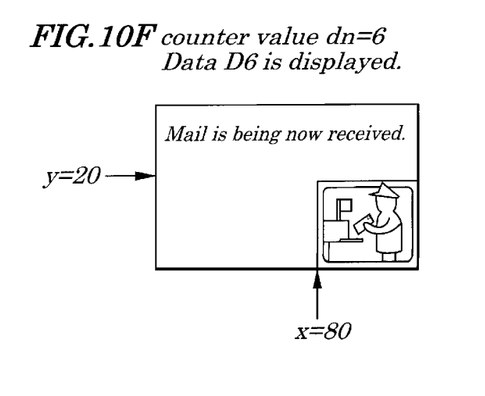

FIG. 10(a) shows a case where a count value "dn" of the data read counter is "1" and data D1 is displayed as information to be displayed and character display data "Mail is being now received" is displayed at display positions being x=0 and y=0 on a screen until a series of processing is terminated. FIG. 10(b) shows a case where a count value "dn" of the data read counter is "2" and character display data "Mail is being now received" is displayed at positions of x=0 and y=0 and image display data given by "g" is displayed at positions of x=0 and y=20 in accordance with contents of the data D2. FIG. 10(c) shows a case where a count value "dn" of the data read counter is "3" and character display data "Mail is being now received" is displayed at positions of x=0 and y=0 and image display data given by "g" is displayed at positions of x=20 and y=20 in accordance with contents of the data D3. FIG. 10(d) shows a case where a count value "dn" of the data read counter is "4" and character display data "Mail is being now received" is displayed at positions of x=0 and y=0 and image display data given by "g" is displayed at positions of x=40 and y=20 in accordance with contents of the data D4. FIG. 10(e) shows a case where a count value "dn" of the data read counter is "5" and character display data "Mail is being now received" is displayed at positions of x=0 and y=0 and image display data given by "g" is displayed at positions of x=60 and y=20 in accordance with contents of the data D5. FIG. 10(f) shows a case where a count value "dn" of the data read counter is "6" and character display data "Mail is being now received" is displayed at positions of x=0 and y=0 and image display data given by "g" is displayed at positions of x=80 and y=20 in accordance with contents of the data D6.

Thus, as shown in FIGS. 10(a) to 10(f), during mail receiving operations of the portable cellular phone, under the character display of "Mail is being now received" on the screen, an image showing an automobile appears and, as time goes by, it moves horizontally from left to right sequentially, and finally an image showing that mail is delivered appears, displaying that the mail has been received. This enables the operation of receiving mail to be traced intuitively by the user's eyesight.

Thus, according to the embodiment, since the information packaged data constructed by combining the display data with the appended data adapted to instruct various processing to be carried out is employed, displaying operations can be easily and accurately performed as a series of packaged operations. By incorporating the appended data into operation software of the portable cellular phone, even if any packaged data is randomly read, a series of processing can be exactly carried out. Moreover, by receiving the information packaged data from other portable cellular phones, data to be used for displaying can be made shareable.

Also, in the portable cellular phone of the embodiment, it is not necessary to pre-determine a memory location in which the above packaged data is to be stored, that is, the information packaged data can be stored in any location if the data is within a specified range of data length. Therefore, the information packaged data can be stored not only in a ROM area in a fixed manner but also in a rewritable RAM area arbitrarily. This means that the information packaged data can be rewritten after being input to the portable cellular phone. Processing for displaying can be carried out not only by reading the information packaged data from memories within the portable cellular phone but also by inputting additional data together with the information packaged data from the outside. As the device to be connected with outside devices, for example, an IRDA (Infrared data)-type signal receiving device can be employed. Moreover, since characters or images to be provided by the information packaged data can be displayed only on a part of the screen of the portable cellular phone by designating a location in which contents of the information packaged data are to be displayed and the use of an entire screen for each piece of the data is not required, amounts of memory to be used can be saved. Furthermore, since the time for which one image is being displayed and/or number of times of repetition of displaying are designated by the appended data, these factors can be set arbitrarily, thus providing flexibility to image data input from the outside.

It is apparent that the present invention is not limited to the above embodiments but may be changed and modified without departing from the scope and spirit of the invention. For example, the appended data can be reduced to the minimum or can be expanded so as to implement multifunctions, that is, designation of display position or display timing can be removed from the information packaged data. As a result, the appended data can be constructed of only operation commands, which reduces amounts of data used and enables simplified software for displaying. Moreover, by adding the appended data, various additional processing can be provided; for example, it is made possible to display characters or images in reverse video or to designate a speed of graphics-drawing so that an image appears slowly or quickly or sounds for surrounding effects such as music, voice, pseudo-sound matching the image are produced. Furthermore, the present invention can be easily implemented by software, as described above, by incorporating a program storing contents of the present invention into hardware made up of the main control section 4 having the CPU, the MMI control section 5 with the man-machine interface, displaying said display data.the memory section 6 having the ROM and RAM, output devices having the display section 7, speaker 8, the vibrator 9, the input devices having the microphone 10 and keyboard 11. By preparing, in advance, storage media such as a magnetic tape, floppy disk, CD-ROM or a like storing the above program and having an arbitrary device read the program, the portable cellular phone can be generally implemented.

What is claimed is:

1. A portable cellular phone comprising:
   a main control means for, by using information packaged data comprising display data and appended data for providing instructions for displaying said display data by designating at least one dot unit, performing specified displaying operations in accordance with said appended data; and
   a displaying means for displaying said display data.

2. The portable cellular phone according to claim 1, wherein said appended data comprises:
   operation commands which designate processing operations by command numbers;
   information about sound designation to designate displaying methods by sounds;
   information about numbers of times of repetition to designate numbers of times of repetition of processing to be carried out in accordance with said information packaged data; and
   information about amounts of said appended data to designate amounts of said appended data providing instructions for processing of displaying said display data.

3. The portable cellular phone according to claim 2, wherein said appended data comprises:
   information about positions for displaying said display data on a screen of said portable cellular phone corresponding to amounts of said appended data;
   information about displaying timing showing a period of displaying said display data corresponding to amounts of said appended data; and
   information about displaying contents of said display data corresponding to amounts of said appended data.

4. The portable cellular phone according to claim 2, further comprising a memory means comprising a fixed-type memory or a rewritable memory to store said information packaged data for each of said operation commands, and wherein said main control means is constructed so as to read said information packaged data by said command numbers and to be able to use said information packaged data for processing of said display data.

5. The portable cellular phone according to claim 1, wherein said information packaged data is able to be fetched from other devices and/or phones using radio signals.

6. The portable cellular phone according to claim 1, wherein said information packaged data is able to be sent and/or received through external data input/output means.

7. The portable cellular phone according to claim 6, wherein said external data input/output means comprises a wireless-type data sending and receiving device.

8. A method for displaying image data in a portable cellular phone comprising:
   performing, by using information packaged data comprising display data and appended data for providing instructions for displaying said display data by designating at least one dot unit, specified displaying operations in accordance with said appended data; and 9. A program for causing a central processing unit to carry out display operations of the portable cellular phone, said program comprising:
   instructions for performing, by using said information packaged data comprising display data and appended data for providing instructions for displaying said display data by designating at least one dot unit, specified displaying operations in accordance with said appended data; and
   instructions for displaying said display data.

10. A storage medium storing a program for causing a central processing unit to carry out display operations of the portable cellular phone, said program comprising:
    instructions for performing, by using said information packaged data comprising display data with appended data for providing instructions for displaying said display data by designating at least one dot unit, specified displaying operations in accordance with said appended data; and
    instructions for displaying said display data.

11. A portable cellular phone comprising:
    a main controller for, by using information packaged data comprising display data and appended data for providing instructions for displaying said display data by designating at least one dot unit, performing specified displaying operations in accordance with said appended data; and
    a displaying section for displaying said display data.

12. The portable cellular phone according to claim 11, wherein said appended data comprises:
    operation commands which designate processing operations by command numbers;
    information about sound designation to designate displaying methods by sounds;
    information about numbers of times of repetition to designate numbers of times of repetition of processing to be carried out in accordance with said information packaged data; and
    information about amounts of said appended data to designate amounts of said appended data providing instructions for displaying said display data.

13. The portable cellular phone according to claim 12, wherein said appended data comprises:
    information about positions for displaying said display data on a screen of said portable cellular phone corresponding to amounts of said appended data;
    information about displaying timing showing a period of displaying said display data corresponding to amounts of said appended data; and
    information about displaying showing contents of said display data corresponding to amounts of said appended data.

14. The portable cellular phone according to claim 12, further comprising a fixed-type memory or a rewritable memory to store said information packaged data for each of said operation commands, and wherein said main controller is constructed so as to read said information packaged data by said command numbers and to be able to use said information packaged data for processing of said display data.

15. A portable cellular phone comprising:
    a controller that performs display operations based upon appended data from an information package data that comprises display data and the appended data to provide display specifications, wherein the appended data provides instructions for displaying the display data by designating at least one dot unit; and a display that displays the display data in accordance with the display specifications.

16. The phone of claim 15, wherein the appended data comprises a command number that designates a display operation.

17. The phone of claim 15, wherein the appended data comprises position information for displaying the display data at a position on the display.

18. The phone of claim 15, wherein the appended data comprises timing data that designates an amount of time to display the display data.

19. The phone of claim 15, wherein the appended data comprises a sound designator to designate a sound.

20. The phone of claim 15, wherein the appended data comprises repetition times that designate the number of times the appended data is to be processed based upon the amount of appended data.

* * * * *